(12) United States Patent
Nagasaka (10) Patent No.: US 8,520,029 B2
(45) Date of Patent: Aug. 27, 2013

(54) IMAGE DISPLAY DEVICE, IMAGE DISPLAY METHOD, AND PROGRAM

(75) Inventor: Hidenori Nagasaka, Toyota (JP)

(73) Assignee: Aisin AW Co., Ltd., Anjo (JP)

( * ) Notice: Subject to any disclaimer, the term of this patent is extended or adjusted under 35 U.S.C. 154(b) by 147 days.

(21) Appl. No.: 13/278,748

(22) Filed: Oct. 21, 2011

(65) Prior Publication Data

US 2012/0098868 A1    Apr. 26, 2012

(30) Foreign Application Priority Data

Oct. 22, 2010  (JP) ................. 2010-237918

(51) Int. Cl.
 *G09G 5/00* (2006.01)
 *G09G 5/39* (2006.01)
 *G06F 3/048* (2013.01)

(52) U.S. Cl.
 USPC ............ 345/684; 345/531; 715/784; 715/786

(58) Field of Classification Search
 None
 See application file for complete search history.

(56) References Cited

U.S. PATENT DOCUMENTS

| 7,202,857 | B2 * | 4/2007 | Hinckley et al. | 345/173 |
| 7,479,949 | B2 * | 1/2009 | Jobs et al. | 345/173 |
| 8,284,170 | B2 * | 10/2012 | Bernstein | 345/174 |
| 2004/0125088 | A1 * | 7/2004 | Zimmerman et al. | 345/173 |
| 2008/0092078 | A1 * | 4/2008 | Takeshima et al. | 715/786 |
| 2009/0228901 | A1 * | 9/2009 | Beaver et al. | 719/318 |
| 2010/0138776 | A1 | 6/2010 | Korhonen | |
| 2010/0235794 | A1 | 9/2010 | Ording | |

FOREIGN PATENT DOCUMENTS

| EP | 0 536 554 A1 | 4/1993 |
| JP | A-06-149531 | 5/1994 |
| JP | A-2002-366286 | 12/2002 |
| JP | A-2007-018040 | 1/2007 |

OTHER PUBLICATIONS

Japanese Patent Office, Notification of Reason for Refusal mailed Nov. 13, 2012 in Japanese Patent Application No. 2010-237918 w/Partial English-language Translation.
Mar. 6, 2012 European Search Report issued in EP 11 18 5906.

* cited by examiner

*Primary Examiner* — Kee M Tung
*Assistant Examiner* — Nurun N Flora
(74) *Attorney, Agent, or Firm* — Oliff & Berridge, PLC

(57) ABSTRACT

An image display devices, methods, and programs that displays an image on a display screen. The devices, methods, and programs detect pressed coordinate positions on the display screen, store the detected pressed coordinate positions in a memory at a predetermined time interval in a time sequence, and if, after a pressing on the display screen has been cancelled, the display screen is not pressed again before a predetermined pressing cancellation judging time passes, determining a cancellation of the pressing on the display screen. The devices, methods, and programs set a predetermined delay time based on the predetermined pressing cancellation judging time, after the predetermined delay time has passed since the pressing on the display screen started, read out the stored pressed coordinate positions at the predetermined time interval and in the time sequence, and scroll the image so as to follow a movement of the read-out pressed coordinate positions.

14 Claims, 9 Drawing Sheets

IMAGE DISPLAY DEVICE, IMAGE DISPLAY METHOD, AND PROGRAM

INCORPORATED BY REFERENCE

The disclosure of Japanese Patent Application No. 2010-237918, filed on Oct. 22, 2010, including the specification, drawings, and abstract thereof, is incorporated herein by reference in its entirety.

BACKGROUND

1. Related Technical Fields

Related technical fields include image display devices, image display methods, and programs that enable a user to perform a scroll operation of an image through pressing a screen.

2. Related Art

Conventionally, devices provided with a liquid crystal display such as in-vehicle navigation devices, portable information equipments including PDAs (Personal Digital Assistants) and cellular phones, portable music players, portable game devices, personal computers, and the like are likely to have a touch panel or the like on the front face of the liquid crystal display to accept a user's operation. On the devices provided with a touch panel, it is possible to perform a scroll operation of the image by moving a finger with the screen being pressed by the finger (i.e., perform a drag operation).

The touch panel here employs a system such as a resistive system (a pressure sensitive system), an electrostatic capacitance system, or the like. Pressed coordinate positions on the screen and a cancellation of pressing are detected based on a change in pressure or electrostatic capacitance generated when a part of the user's body (for example, a finger) or a pen has touched the touch panel. When performing the above-mentioned scroll operation, the finger of the user or the like may temporarily lift up from the touch panel or the pressure the touch panel is being pressed may be reduced while dragging against the user's intention. If a cancellation of the pressing on the screen (a touch-off) is determined in such case, the scroll may be temporarily stopped against the user's intention.

In order to solve the above-mentioned problem, the following method is considered. A touch-off is not determined immediately after the touch-off was detected. That is, after the touch-off was detected, if a new pressing on the screen is detected within a predetermined time period, the touch-off is not determined under the assumption that the pressing on the screen continues. Only if a new pressing on the screen is not detected within the predetermined time period, the touch-off is determined. For example, Japanese Patent Application; Publication No. 2002-366286 discloses a technology that, in a key input processing device including a unit that detects ON/OFF of a key at a predetermined interval, an OFF of a key input is determined when two or more OFFs have been sequentially detected.

SUMMARY

In the devices provided with a touch panel as described above, if a touch-off is performed by flicking a finger pressing the screen in a scroll direction (i.e., a flick operation), a processing that scrolls the image according to a moving direction and a moving speed of the finger is generally performed. However, like conventional technologies, if a certain time period (hereinafter, referred to as "pressing cancellation judging time") to determine a touch-off after the touch-off has been detected is set, a starting of a scroll is delayed for the pressing cancellation judging time when scrolling the image based on the moving direction and the moving speed of the pressed coordinate position when the touch-off of the flick operation was detected. Thus, when the flick operation has been performed, a problem occurs, in which the scroll of the image is temporarily stopped, thereby the image is not smoothly moved in the scroll direction.

Figure 9:
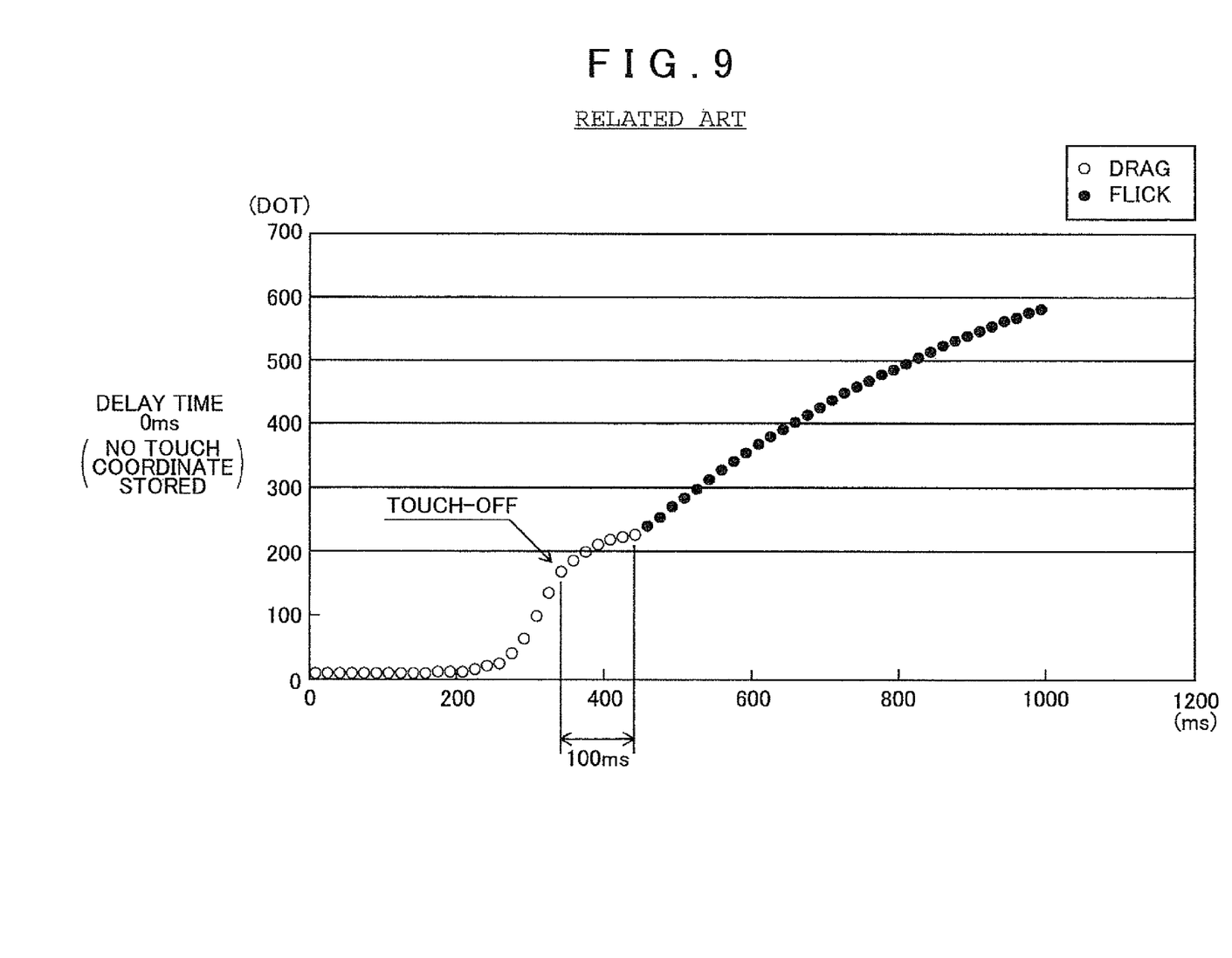
FIG. 9 shows an example of scrolling the image when the delay time is not set and the pressing cancellation judging time is 100 msec., as is conventionally done.

For example, as shown in FIG. 9, if the pressing cancellation judging time is approximately 100 msec., after the touch-off, the scroll by the drag operation is temporarily stopped or the scroll speed considerably decreases for the pressing cancellation judging time, i.e., for approximately 100 msec., and thereafter the scroll by the flick operation starts. Thus, the image is not smoothly moved after the touch-off until the scroll by the flick operation starts, which gives the user an uncomfortable feeling. In FIG. 9, a horizontal axis represents a time period in a unit of msec., and a vertical axis represents a scroll amount in a unit of dot.

To solve the above-mentioned problem, exemplary implementations of the broad inventive principles described herein provide an image display device, an image display method, and a program that are capable of smoothly transiting a scroll by a drag operation to a scroll by a flick operation even when the pressing cancellation judging time is set.

Exemplary implementations provide: a display unit that displays an image and accepts an operation of the image by an user through pressing on a display screen; a coordinate detecting unit that detects pressed coordinate positions pressed on the display screen of the display unit; a coordinate storing unit that stores the detected pressed coordinate positions at a predetermined time interval and in a time sequence; a pressing cancellation determining unit that, if the display screen is not pressed again before a predetermined pressing cancellation judging time passes after a pressing on the display screen has been cancelled, determines a cancellation of the pressing on the display screen; and a scroll controlling unit that, after a predetermined delay time set based on the predetermined pressing cancellation judging time has passed since the pressing on the display screen started, reads out at the predetermined time interval in the time sequence the pressed coordinate positions stored by the coordinate storing unit and controls to scroll the image so as to follow a movement of the pressed coordinate positions.

According to exemplary implementations, the predetermined delay time is set within a range between a time 20% shorter and a time 20% longer with respect to the predetermined pressing cancellation judging time.

According to exemplary implementations, the predetermined delay time is set so as to be a time longer than the predetermined pressing cancellation judging time.

According to exemplary implementations, the coordinate detecting unit includes a pressure sensitive touch panel placed on the display screen, and the coordinate detecting unit detects the pressed coordinate positions through the pressure sensitive touch panel.

Exemplary implementations provide a display method including: detecting pressed coordinate positions pressed on a display screen of a display device; storing the pressed coordinate positions detected at the coordinate detecting step at a predetermined time interval and in a time sequence; after a predetermined delay time set based on a predetermined pressing cancellation judging time has passed since a pressing on the display screen started, reading out at the predetermined time interval in the time sequence the pressed coordinate positions stored at the coordinate storing step and controlling to scroll the image so as to follow a movement of the pressed coordinate positions; and if the display screen is not pressed again before the predetermined pressing cancellation judging time passes after the pressing on the display screen has been cancelled, determining a cancellation of the pressing on the display screen.

Exemplary implementations provide a display program causing a computer to execute the steps of: detecting pressed coordinate positions pressed on a display screen of a display device; storing the pressed coordinate positions detected at the coordinate detecting step at a predetermined time interval and in a time sequence; after a predetermined delay time set based on a predetermined pressing cancellation judging time has passed since a pressing on the display screen started, reading out at the predetermined time interval in the time sequence the pressed coordinate positions stored at the coordinate storing step and controlling to scroll the image so as to follow a movement of the pressed coordinate positions; and if the display screen is not pressed again before the predetermined pressing cancellation judging time passes after the pressing on the display screen has been cancelled, determining a cancellation of the pressing on the display screen.

According to exemplary implementations, if the user has moved his or her finger or the like while pressing the screen (if the user has performed a drag operation), the pressed coordinate positions are stored at a predetermined time interval (for example, at intervals of approximately 20 msec.) in a time sequence after the pressing has started. Then, after the predetermined delay time (for example, approximately 100 msec.) set based on the pressing cancellation judging time (for example, approximately 100 msec.) for judging a determination of a cancellation of the pressing on the display screen has passed since the pressing started, the image is scrolled so as to follow the movement of the stored pressed coordinate positions after the pressing started.

Because of this configuration, if the user has cancelled the pressing on the display screen, for example, if the user has flicked his or her finger in the scroll direction (the user has performed a flick operation), the image can be continuously scrolled so as to follow the movement of the already-stored pressed coordinate positions for the predetermined delay time. Thereafter, if the cancellation of the pressing on the display screen has been determined, the image can be scrolled based on the moving direction and the moving speed of the pressed coordinate positions stored when the pressing on the display screen has been cancelled.

In addition, the predetermined delay time to start a scroll of the image after the user has started a drag operation is set based on the pressing cancellation judging time. Therefore, it is possible to realize an appropriate, i.e., well-following, smooth, and well-balanced image scroll Thus, when the user has performed a flick operation after a drag operation, even if the pressing cancellation judging time is being set, it is possible to smoothly transit from the scroll by the drag operation to the scroll by the flick operation. In addition, if the user has finished the drag operation, the image stops after the predetermined delay time has passed. Thus, it is possible to terminate scrolling the image without giving the user an uncomfortable feeling.

In addition, according to exemplary implementations, if the user has performed a drag operation, the image is scrolled in the predetermined delay time that is set within a range between a time 20% shorter and a time 20% longer with respect to the pressing cancellation judging time (for example, approximately 100 msec.) (for example, the delay time is between approximately 80 msec. and 120 msec.) Thus, when the user has performed the drag operation, a temporal error between the pressing cancellation judging time and the delay time is 20% or less. Thus, it is possible to smoothly scroll the image without giving the user an uncomfortable feeling.

In addition, when the user has performed a flick operation after a drag operation, the scroll can be performed so as to follow the movement of the pressed coordinate positions for the predetermined delay time that is set within a range a time 20% shorter and a time 20% longer with respect to the pressing cancellation judging time. Therefore, when the user has performed a flick operation after a drag operation, it is possible to smoothly transit from the scroll by the drag operation to the scroll by the flick operation almost without stopping the scroll of the image.

According to exemplary implementations, when the user has performed a drag operation, the image is scrolled in the predetermined delay time that is set longer than the pressing cancellation judging time (for example, approximately 100 msec.) (for example, the delay time is approximately 110 to 120 msec.) Thus, when the user has performed the drag operation, it is possible to smoothly scroll the image without giving the user an uncomfortable feeling.

In addition, when the user has performed a flick operation after a drag operation, it is possible to securely scroll the image so as to follow the movement of the pressed coordinate positions stored in a time sequence for the pressing cancellation judging time, because the pressed coordinate positions for the predetermined delay time that is set longer than the pressing cancellation judging time are stored at the predetermined time interval in the time sequence. Therefore, when the user has performed a flick operation after a drag operation, in conventional technologies, the scroll of the image is temporarily stopped till the cancellation of the pressing is determined and the scroll of the image starts. However, according to exemplary implementations, it is possible to securely scroll the image in a continuous manner, without the image being temporarily stopped, till the cancellation of the pressing is determined and the scroll of the image starts. Thus, it is possible to smoothly transit from the scroll by the drag operation to the scroll by the flick operation.

Further, according to exemplary implementations, the pressed coordinate positions are detected through a pressure sensitive touch panel placed on the display screen. The pressure sensitive touch panel requires that the panel continue pressed by a certain pressure due to its characteristic. However, the pressure may temporarily decrease against the user's pressing intention during the drag operation. Consequently, if the pressed coordinate positions on the display screen are detected through the pressure sensitive touch panel, it is especially beneficial to set the pressing cancellation judging time for determining the cancellation of the pressing on the display screen. Consequently, the inventive principles described herein are applied to the pressure sensitive touch panel, the above-mentioned effects can be more remarkably obtained.

In addition, if the pressed coordinate positions on the display screen are detected through the pressure sensitive touch panel, when the user has performed a flick operation after a drag operation, it is possible to smoothly transit from the scroll by the drag operation to the scroll by the flick operation without stopping the scroll of the image.

DETAILED DESCRIPTION OF THE PREFERRED EXAMPLE

Hereinafter, specific examples of an image display device, an image display method, and a program that are implemented in a navigation device will be explained in detail with reference to the drawings.

1. Structure

First, a schematic structure of the navigation device according to the present example will be explained with reference to FIG. 1.

Figure 1:
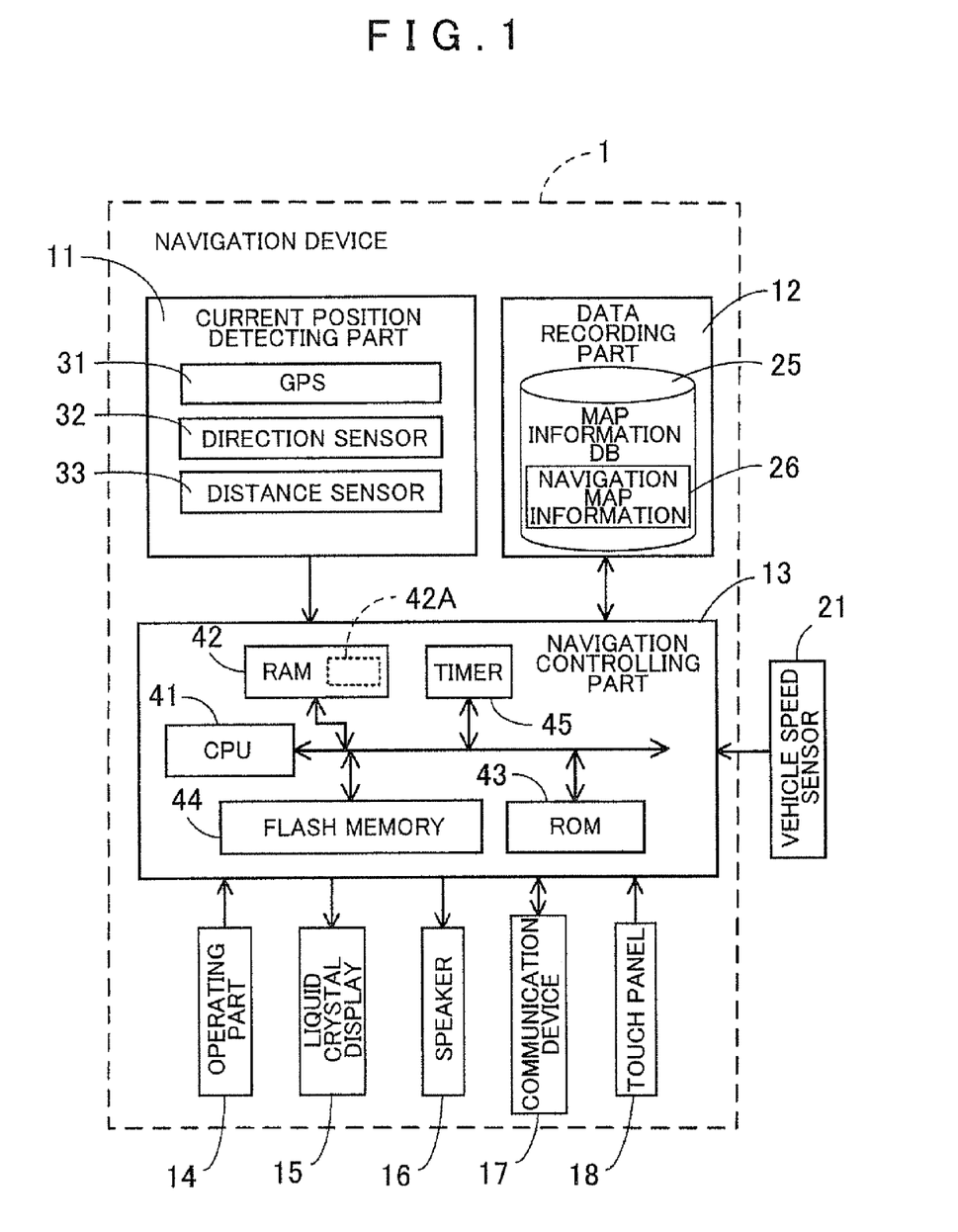
FIG. 1 is a block diagram showing a navigation device according to the present example.

FIG. 1 is a block diagram showing a navigation device 1 according to the present example.

As shown in FIG. 1, the navigation device 1 according to the present example is composed by: a current position detecting part 11 that detects a current position of a vehicle and the like; a data recording part 12 in which various kinds of data is recorded; a controller (e.g., navigation controlling part 13) that performs various kinds of arithmetic processing based on input information; an operating part 14 that accepts an operation from an operator; a liquid crystal display 15 that displays information of a map and the like to the operator; a speaker 16 that outputs audio guidance regarding route guidance and the like; a communication device 17 that performs communication with a road traffic information center (not shown), a map information delivery center, and the like via a cellular phone network; and a touch panel 18 installed on a surface of the liquid crystal display. The navigation controlling part 13 is connected with a vehicle speed sensor 21 that detects a travel speed of a vehicle.

Hereinafter, the respective components composing the navigation device 1 are explained. The current position detecting part 11 includes at least one of a GPS 31, a direction sensor 32, a distance sensor 33, and the like, and can detect the current position of the vehicle (hereinafter, referred to as "vehicle position"), a vehicle direction representing a direction of the vehicle, a travel distance, and the like.

The data recording part 12 is provided with a hard disk (not shown) serving as an external storage device and a storage medium, and a driver (not shown) for reading a map information database (a map information DB) 25, a predetermined program, and the like, which are recorded in the hard disk, and writing predetermined data in the hard disk.

The map information DB 25 stores navigation map information 26, which is used for travel guidance and route search of the navigation device 1. The navigation map information 26 is composed by various kinds of information necessary for route guidance and map display. For example, the navigation map information 26 is composed by newly-constructed road information for identifying newly-constructed roads, map display data for displaying a map, intersection data regarding intersections, node data regarding node points, link data regarding roads (links), route search data for searching for a route, shop data regarding POIs (Point of Interest) such as a shop that is a kind of facilities, point search data for searching for a point, and the like.

In addition, for the shop data, data of names, addresses, telephone numbers, coordinate positions on the map (for example, latitudes and longitudes), facility icons for displaying the positions of the facilities on the map, and the like regarding the POIs is stored together with IDs to identify the POIs. The POIs include hotels in respective regions, amusement parks, palaces, hospitals, gas stations, parking lots, stations, airports, ferry ports, and the like.

In addition, contents of the map information DB 25 are updated by downloading update information delivered from the map information delivery center (not shown) through the communication device 17.

As shown in FIG. 1, the navigation controlling part 13 composing the navigation device 1 is provided with: a CPU 41 serving as a computing device and a control device for performing overall control of the navigation device 1; internal storage devices such as a RAM 42 used as a working memory when the CPU 41 executes various arithmetic processing and in which route data or the like when the route has been searched is stored, a ROM 43 which records a program for control, and a flash memory 44 which records a program read from the ROM 43; a timer 45 for measuring a time; and the like.

In addition, the ROM 43 stores a program such as a "touch scroll processing" (refer to FIG. 2) for scrolling a map image so as to follow the pressing of a finger on the display screen of the after-mentioned liquid crystal display 15. The RAM 42 is provided with a touch coordinate storage area 42A or the like in which the after-mentioned six pressed coordinate positions are stored in a time sequence.

Further, the navigation controlling part 13 is electrically connected to respective peripheral devices (an actuator) of the operating part 14, the liquid crystal display 15, the speaker 16, the communication device 17, and the touch panel 18.

The operating part 14 is operated when changing the current position at the time of starting travel and inputting a departure point as a guidance start point and a destination as a guidance end point, or when performing search for information relating to a facility, and is composed by various keys and a plurality of operation switches. The navigation controlling part 13 performs control to execute various operations according to a switch signal outputted by the operation such as pressing of each switch.

On the liquid crystal display 15, map information of currently-traveling area, map information of the vicinity of the destination, operation guidance, an operation menu, key guidance, a recommended route from the current position to the destination, guidance information along the recommended route, traffic information, news, weather forecast, time, E-mail, TV programs, and the like are displayed.

The speaker 16 outputs audio guidance for traveling along the recommended route based on an instruction from the navigation controlling part 13, and the like. For example, the audio guidance as "200 m ahead, to the right direction at XX intersection." is provided.

The communication device 17 is a communication unit that performs communication with the map information delivery center through a cellular phone network or the like. The communication device 17 transmits and receives the latest version of the update map information to and from the map information delivery center. In addition, the communication device 17 receives the traffic information including respective information such as congestion information, congestion status of a service area, and the like, each of which is transmitted from the road traffic information center or the like, in addition to the map information delivery center.

The touch panel 18 is a transparent panel-type touch switch provided on the surface of the liquid crystal display 15, and configured such that various kinds of instruction commands can be inputted by pressing a button or the map displayed on a screen of the liquid crystal display 15 and scrolling the map image or the like can be performed as described below. The touch panel 18 employs a resistive system (a pressure sensitive system). The touch panel 18 may employ an electrostatic capacitance system or an optical sensor type liquid crystal system where the screen of the liquid crystal display 15 is directly pressed.

II. Touch Scroll Processing

Next, an example of a touch scroll processing method will be described with reference to the algorithms in FIGS. 2 and 3. The methods may be implemented by a computer program stored in the RAM 42, ROM 43, and/or flash memory 44 that is executable by the CPU 41. Although the structure of the above-described navigation device 1 is referenced in the description of the methods, the reference to such structure is exemplary, and the methods need not be limited by the specific structure of the above-described navigation device 1.

Figure 2:
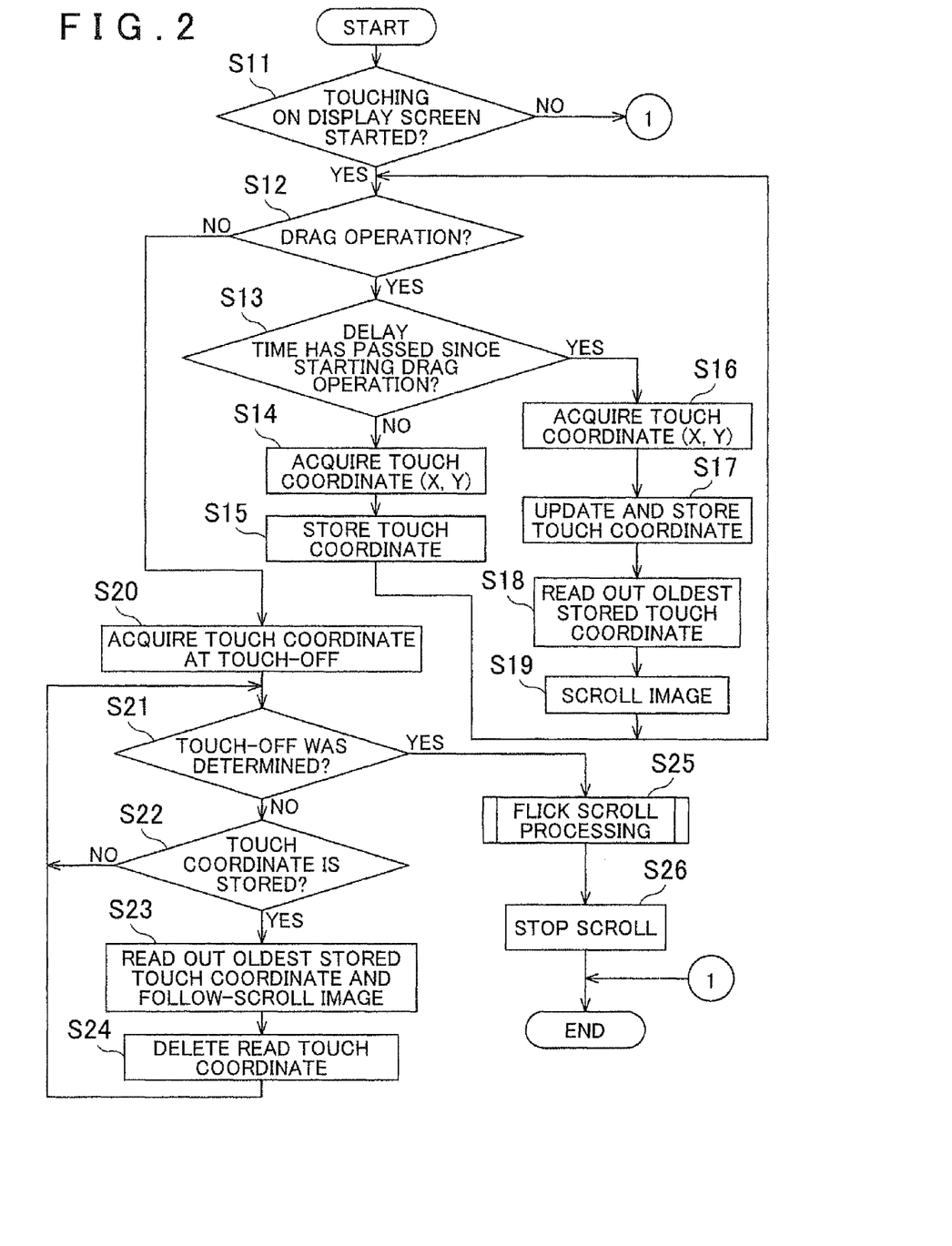
FIG. 2 is a flowchart showing a "touch scroll processing" algorithm to scroll the image so as to follow the pressed coordinate positions by a finger on a display screen.

As shown in FIG. 2, first, at Step (hereinafter referred to as "S") 11, the CPU 41 executes a judgment processing that judges whether the pressing of the touch panel 18 has started. If the pressing of the touch panel 18 has not started (S11: NO), the CPU 41 terminates the processing.

On the other hand, if the pressing of the touch panel 18 has started (S11: YES), the CPU 41 reads out a pressing started time of the touch panel 18 from the timer 45, stores it in the RAM 42, and thereafter transits to the processing at S12. At S12, the CPU 41 executes a judgment processing that judges whether the finger is moving while pressing the touch panel 18 (whether a drag operation is being performed).

If the CPU 41 has judged that the drag operation is being performed (S12: YES), the CPU 41 proceeds to the processing at S13. At 513, the CPU 41 reads out from the ROM 43 a delay time T1 to delay the timing to start scrolling the image by the drag operation and executes a judgment processing that judges whether the delay time T1 has passed since the pressing of the touch panel 18 started.

Specifically, the CPU 41 executes a judgment processing that judges whether a time difference between the current time of the timer 45 and the pressing started time of the touch panel 18 stored in the RAM 42 has become longer than the delay time T1. Note that the delay time T1 (for example, T1=approximately 100 msec.) is set so as to be almost the same as a pressing cancellation judging time T2 (for example, T2=approximately 100 msec.) that is the time from the detection of the pressing cancellation (hereinafter referred to as "touch-off") of the touch panel 18 to a determination of the touch-off.

If the CPU 41 has judged that the delay time T1 has not passed since starting the drag operation (S13: NO), the CPU 41 proceeds to the processing at S14. At S14, the CPU 41 acquires a pressed coordinate position (hereinafter referred to as "touch coordinate") when starting the pressing of the touch panel 18 or a touch coordinate when 20 msec. has passed since the time when the previous touch coordinate was acquired.

Subsequently, at S15, the CPU 41 stores, in the time sequence, the touch coordinate acquired at S14 in a drag coordinate memory where a touch coordinate is not stored yet among six drag coordinate memories A to F (refer to FIG. 4) provided in the touch coordinate storage area 42A of the RAM 42, and thereafter executes the processing at S12 and the subsequent processings.

Consequently, the CPU 41, for the delay time T1 after starting the drag operation, stores the touch coordinate when starting the pressing of the touch panel 18 in the drag coordinate memory A, and the touch coordinates of the respective time points at intervals of 200 msec. from starting the pressing of the touch panel 18 in the drag coordinate memories B to F, sequentially.

If the delay time T1 is approximately 100 msec., the six drag coordinate memories A to F are provided in the touch coordinate storage area 42A. However, the number of drag coordinate memories is not limited, provided that it is the number that can store the touch coordinates acquired at intervals of 20 msec. for the delay time T1 after starting the pressing of the touch panel 18. For example, if the delay time T1 is 66.4 msec., four drag coordinate memories A to D may be provided in the touch coordinate storage area 42A. In addition, if the delay time T1 is 83.0 msec., five drag coordinate memories A to E may be provided in the touch coordinate storage area 42A.

On the other hand, if the CPU 41 has judged at S13 that the delay time T1 has passed since starting the drag operation (S13: YES), the CPU 41 proceeds to the processing at S16. At S16, the CPU 41 acquires the touch coordinate when 20 msec, has passed since the previous touch coordinate was acquired.

At S17, the CPU 41 reads out the touch coordinate that is the oldest, i.e., that was stored earliest from the drag coordinate memory A among the touch coordinates stored in the drag coordinate memories A to F of the touch coordinate storage area 42A, and stores the read touch coordinate as the touch coordinate for scroll in the RAM 42. Thereafter, the CPU 41 sequentially moves forward the touch coordinates stored in the respective drag coordinate memories B to F to the drag coordinate memories A to E in the time sequence and stores them, and thereafter stores the touch coordinate acquired at S16 in the drag coordinate memory F as the latest touch coordinate. That is, the stored touch coordinates are the newly-acquired six touch coordinates.

Subsequently, at S18, the CPU 41 reads out the touch coordinate for scroll that was stored in the RAM 42 at S17, that is, the oldest touch coordinate. At S19, if the touch coordinate for scroll read from the RAM 42 is the touch coordinate for scroll read for the first time after the delay time T1 has passed since starting the drag operation, that is, if the touch coordinate for scroll read from the RAM 42 is the touch coordinate when starting the drag operation, the CPU 41 does not scroll the image and executes the processing at S12 and subsequent processings.

On the other hand, if the touch coordinate for scroll read from the RAM 42 is the touch coordinate for scroll read for the second time or later after the delay time T1 has passed since starting the drag operation, the CPU 41 scrolls the image such that the point of the image corresponding to the previous touch coordinate for scroll read from the RAM 42 moves to the current touch coordinate for scroll, and thereafter executes the processing at S12 and subsequent processings. Consequently, after the delay time T1 has passed since starting the drag operation, the image is scrolled in accordance with the touch coordinates after starting the drag operation.

If the CPU 41 has judged at S12 that the drag operation is not performed, that is, if the touch-off has been detected (S12: NO), the CPU 41 proceeds to the processing at S20. At S20, the CPU 41 acquires the touch coordinate at the touch-off and stores it as the touch coordinate for flick in the RAM 42. In addition, the CPU 41 reads out the time at the touch-off from the timer 45 and stores it in the RAM 42.

Subsequently, at S21, the CPU 41 reads out from the ROM 43 the pressing cancellation judging time T2 (for example, T2=approximately 100 msec.) to determine the touch-off and executes a judgment processing that judges whether the pressing cancellation judging time T2 has passed since the touch-off was detected. Specifically, the CPU 41 executes a judgment processing that judges whether the time difference between the current time of the timer 45 and the time of the touch-off stored in the RAM 42 has become longer than the pressing cancellation judging time T2.

If the CPU 41 has judged that the pressing cancellation judging time T2 has not passed since the touch-off was detected (S21: NO), the CPU 41 proceeds to the processing at S22. At S22, the CPU 41 executes a judgment processing that judges whether a touch coordinate is stored in any of the respective drag coordinate memories A to F. If the CPU 41 has judged that the touch coordinate is not stored in any of the respective drag coordinate memories A to F (S22: NO), the CPU 41 executes the processing at S21 and subsequent processings.

On the other hand, the CPU 41 has judged that a touch coordinate is stored in any of the respective drag coordinate memories A to F (S22: YES), the CPU 41 proceeds to the processing at S23. At S23, the CPU 41 reads out the touch coordinate that is the oldest, i.e., that was stored earliest among the touch coordinates stored in the drag coordinate memories A to F, and stores the read touch coordinate as the touch coordinate for scroll in the RAM 42.

If 20 msec. has passed since the image was previously scrolled, the CPU 41 reads out the current touch coordinate for scroll from RAM 42. Then, the CPU 41 scrolls the image such that the point of the image corresponding to the previous touch coordinate for scroll that was read from the RAM 42 when previously scrolling the image is moved to the current touch coordinate for scroll.

Subsequently, at S24, the CPU 41 initializes the drag coordinate memory in which the touch coordinate read at S23 was stored, stores the touch coordinate in the RAM 42 to use at the after-mentioned flick scroll processing, and executes the processing at S21 and subsequent processings.

On the other hand, if the CPU 41 has judged at S21 that the pressing cancellation judging time T2 has passed since the touch-off was detected (521: YES), the CPU 41 proceeds to the processing at S25. The CPU 41 executes a sub-processing of a "flick scroll processing" mentioned later (refer to FIG. 3), and thereafter proceeds to the processing at S26. At 526, the CPU 41 stops the scroll of the image and terminates the processing.

Figure 4:
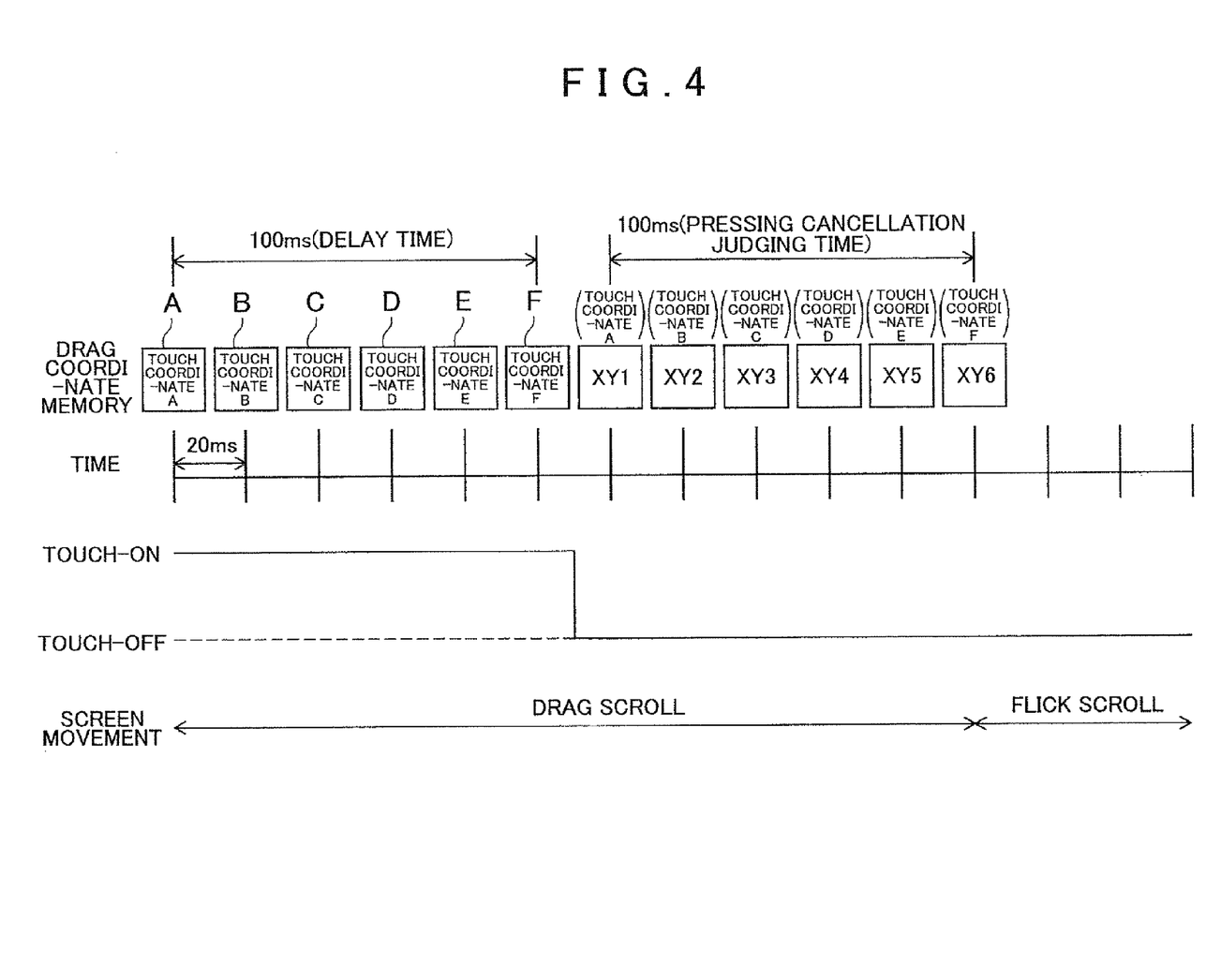
FIG. 4 is an explanatory drawing showing an example of scrolling an image when the pressing has been cancelled.

Here, an example of scrolling the image till the pressing cancellation judging time T2 has passed since the touch-off is explained with reference to FIG. 4. Note that the delay time T1 and the pressing cancellation judging time T2 are set to 100 msec. respectively. As shown in FIG. 4, after having acquired the touch coordinate and the time at the touch-off, the CPU 41 reads out the oldest touch coordinate A that is stored in the drag coordinate memory A and scrolls the image such that the point of the image corresponding to the previous touch coordinate for scroll moves to the touch coordinate A.

Subsequently, if the pressing cancellation judging time T2 has not passed since the touch-off, the CPU 41 reads out the respective touch coordinates B to F stored in the respective drag coordinate memories B to F at intervals of 20 msec. in the time sequence and scrolls the image such that the point of the image corresponding to the previous touch coordinate moves to the read touch coordinate.

That is, the CPU 41 continues scrolling the image by the drag operation (the drag scroll) such that the point of the image corresponding to the previous touch coordinate for scroll sequentially moves to the respective touch coordinates A to F until the pressing cancellation judging time T2 passes since the touch-off. Thereafter, if the pressing cancellation judging time T2 has passed, the CPU 41 starts scrolling the image by the flick operation (a flick scroll processing).

[Flick Scroll Processing]

Next, the sub-processing of the "flick scroll processing" to be executed by the CPU 41 at S25 is explained with reference to FIG. 3.

Figure 3:
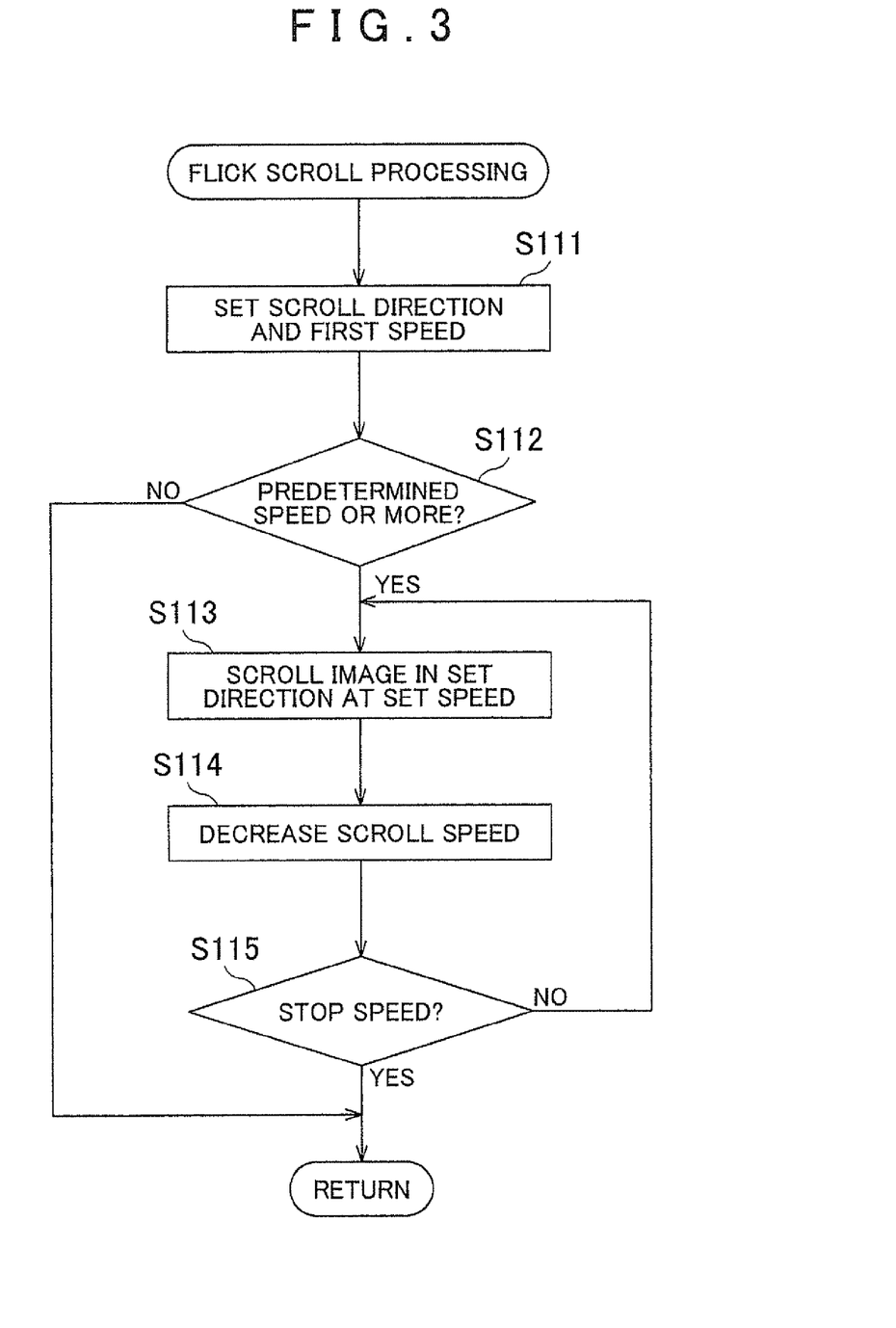
FIG. 3 is a sub-flowchart showing a sub-processing algorithm of a "flick scroll processing" in FIG. 2.

As shown in FIG. 3, first, at S111, the CPU 41 calculates a moving direction and a moving speed of the touch coordinates on the display screen based on the touch coordinate for flick at the touch-off, which was stored in the RAM 42 at S20, and the touch coordinate just before the pressing is released, which had been stored in the drag coordinate memory F and was stored in RAM 42 at S24, sets the calculated moving direction and moving speed as a scroll direction and a first speed of a scroll speed of the image respectively, and stores them in the RAM 42.

Subsequently, at S112, the CPU 41 reads out the first speed from the RAM 42 and executes a judgment processing that judges whether the first speed is equal to or more than a predetermined speed, that is, whether the finger pressing the touch panel 18 has performed a flick operation at the predetermined speed or more in the scroll direction. For example, if the display screen has a resolution of 800×600 dots, the CPU 41 judges whether the first speed is 300 dots/sec. or more.

If the CPU 41 has judged that the first speed read from the RAM 42 is less than the predetermined speed, that is, the finger pressing the touch panel 18 has not performed a flick operation in the scroll direction (S112: NO), the CPU 41 terminates the sub-processing, goes back to the main flowchart, and proceeds to the processing at S26.

On the other hand, if the CPU 41 has judged that the first speed read from the RAM 42 is equal to or more than the predetermined speed, that is, the finger pressing the touch panel 18 has performed a flick operation in the scroll direction (S112: YES), the CPU 41 proceeds to the processing at S113. At S113, the CPU 41 reads out the scroll direction and the first speed of the image from the RAM 42, sets the first speed as the scroll speed, and scrolls the image in the scroll direction for a previously-defined time (for example, 16 msec.).

At S114, the CPU 41 reads out the first speed from the RAM 42, decreases the first speed by a predetermined speed (for example, to approximately 50% of the speed), and stores the decreased speed as the first speed in the RAM 42. That is, the CPU 41 decreases the scroll speed of the image.

Subsequently, at S115, the CPU 41 reads out the first speed from the RAM 42, that is, reads out the scroll speed, and executes a judgment processing that judges whether the scroll speed is a stop speed. Specifically, the CPU 41 executes a judgment processing that judges whether the first speed is equal to or less than 30 dots/sec.

If the first speed, that is, the scroll speed is not the stop speed (S115: NO), the CPU 41 executes the processing at S113 and subsequent processings again. On the other hand, if the first speed, that is, the scroll speed is the stop speed (S115: YES), the CPU 41 terminates the sub-processing, goes back to the main flowchart, and proceeds to the processing at S26.

Here, an example of scrolling the image when the pressing cancellation judging time T2 is 100 msec., the delay time T1 is changed to 66.4 msec., 83 msec., 99.6 msec., and 116 msec. is explained with reference to FIGS. 5 to 8. The CPU 41 sequentially stores the touch coordinates of the respective time points when the pressing of the touch panel 18 started and at intervals of 20 msec. after starting the pressing.

Figure 5:
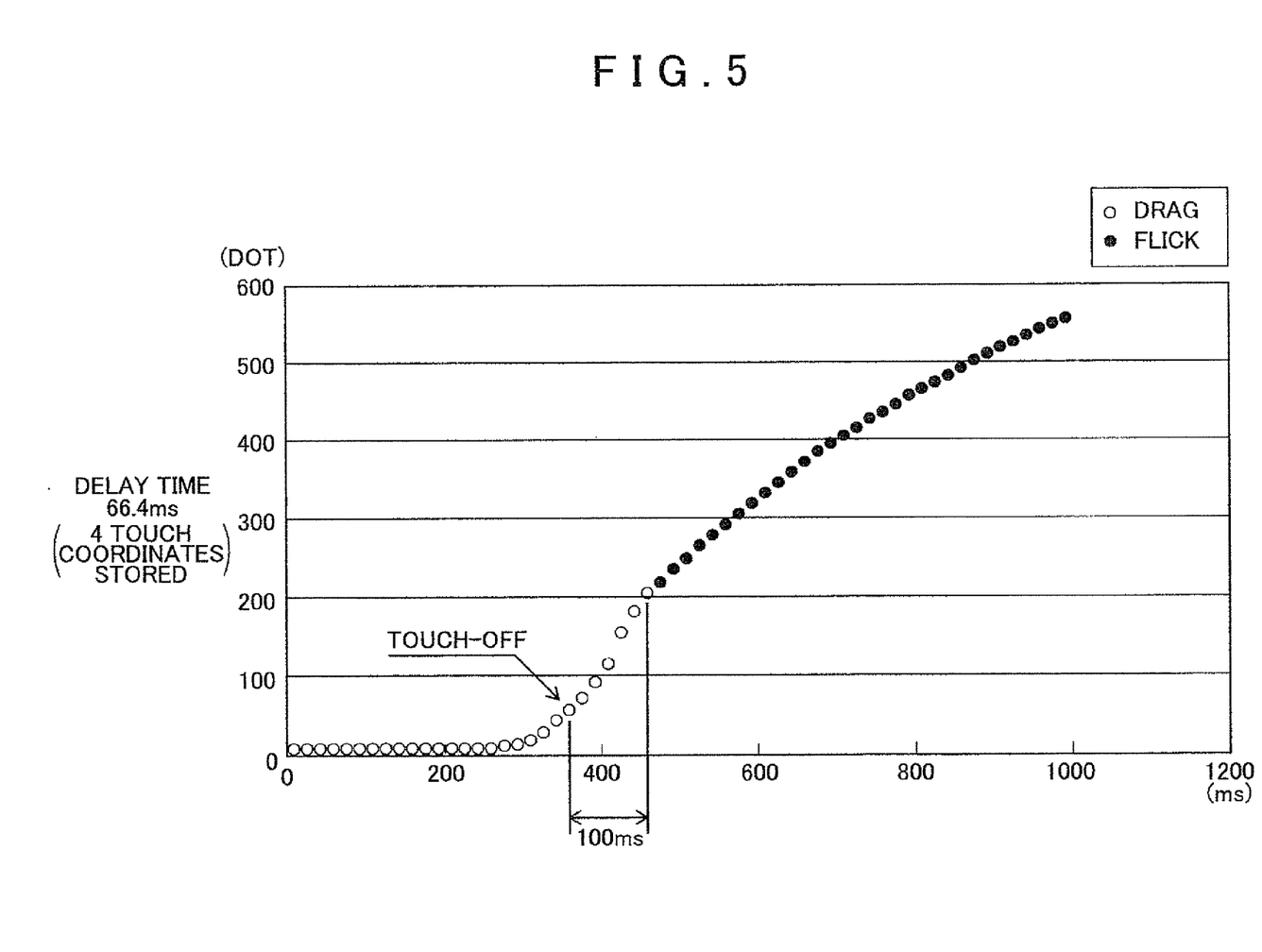
FIG. 5 shows an example of scrolling the image when the delay time is 66.4 msec. and the pressing cancellation judging time is 100 msec.

As shown in FIG. 5, if the pressing cancellation judging time T2 is 100 msec, and the delay time T1 is 66.4 msec., the four drag coordinate memories A to D are provided in the touch coordinate storage area 42A and the four touch coordinates A to D are stored till the delay time T1 passes after starting the drag operation.

Consequently, when 33.6 msec. has passed after the scroll by the drag operation was sequentially performed to the positions corresponding to the four touch coordinates A to D after the touch-off, the scroll by the flick operation starts. Therefore, the following capability of the scroll by the drag operation is favorable.
In addition, after the scroll by the drag operation has terminated, the scroll by the flick operation is delayed 20 msec. or more. That is, the same image continues displayed, which makes the user feel a rough movement of the image. Thereby, the transition from the scroll by the drag operation to the scroll by the flick operation slightly lacks the smoothness.

Figure 6:
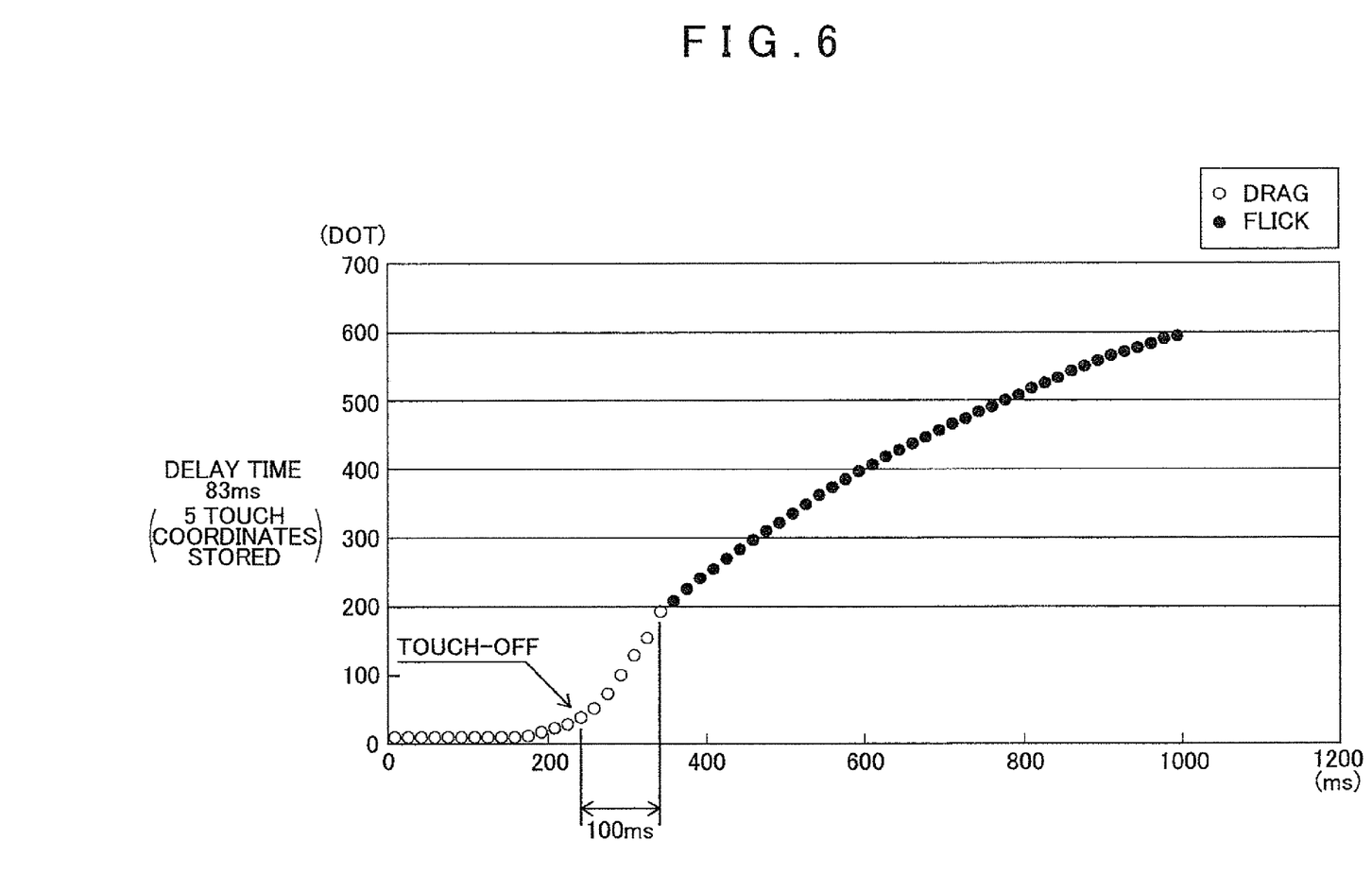
FIG. 6 shows an example of scrolling the image when the delay time is 83 msec. and the pressing cancellation judging time is 100 msec.

In addition, as shown in FIG. 6, if the pressing cancellation judging time T2 is 100 msec. and the delay time T1 is 83 msec., the five drag coordinate memories A to E are provided in the touch coordinate storage area 42A and the five touch coordinates A to E are stored till the delay time T1 passes after starting the drag operation.

Consequently, when 17 msec. has passed after the scroll by the drag operation was sequentially performed to the positions corresponding to the five touch coordinates A to E after the touch-off, the scroll by the flick operation starts. Therefore, the following capability of the scroll by the drag operation is favorable. In addition, after the scroll by the drag operation has terminated, the scroll by the flick operation is not delayed 20 msec. or more. That is, the scroll by the flick operation starts from almost the same image, which makes the user feel a smooth movement of the image. Thereby, the transition from the scroll by the drag operation to the scroll by the flick operation is smooth.

Figure 7:
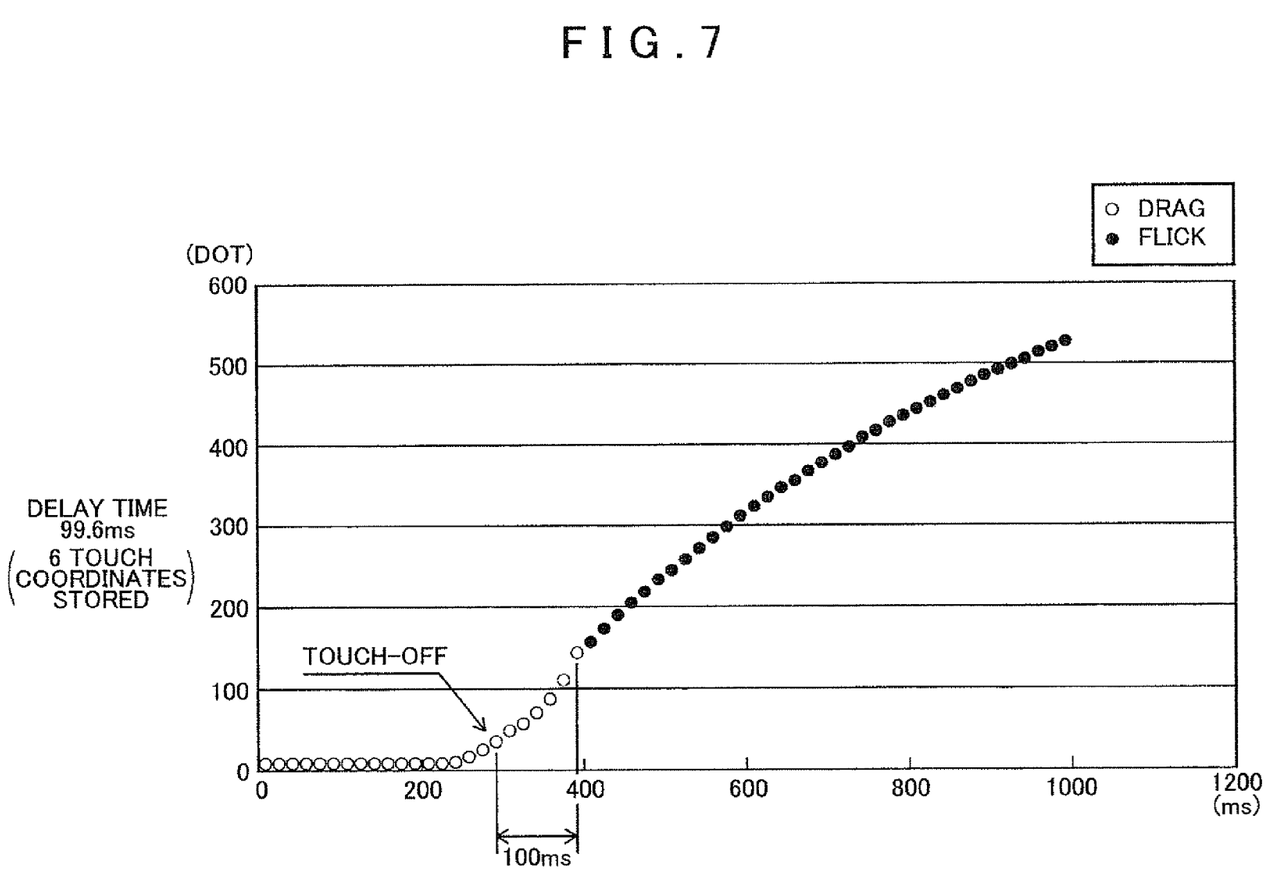
FIG. 7 shows an example of scrolling the image when the delay time is 99.6 msec. and the pressing cancellation judging time is 100 msec.

As shown in FIG. 7, if the pressing cancellation judging time T2 is 100 msec. and the delay time T1 is 99.6 msec., the six drag coordinate memories A to F are provided in the touch coordinate storage area 42A and the six touch coordinates A to F are stored till the delay time T1 passes after starting the drag operation.

Consequently, when 0.4 msec. has passed after the scroll by the drag operation was sequentially performed to the positions corresponding to the six touch coordinates A to F after the touch-off, the scroll by the flick operation starts. Therefore, the following capability of the scroll by the drag operation is favorable. In addition, after the scroll by the drag operation has terminated, the scroll by the flick operation is not delayed 20 msec. or more. That is, the scroll by the flick operation starts from almost the same image, which makes the user feel a smooth movement of the image. Thereby, the transition from the scroll by the drag operation to the scroll by the flick operation is smooth.

Figure 8:
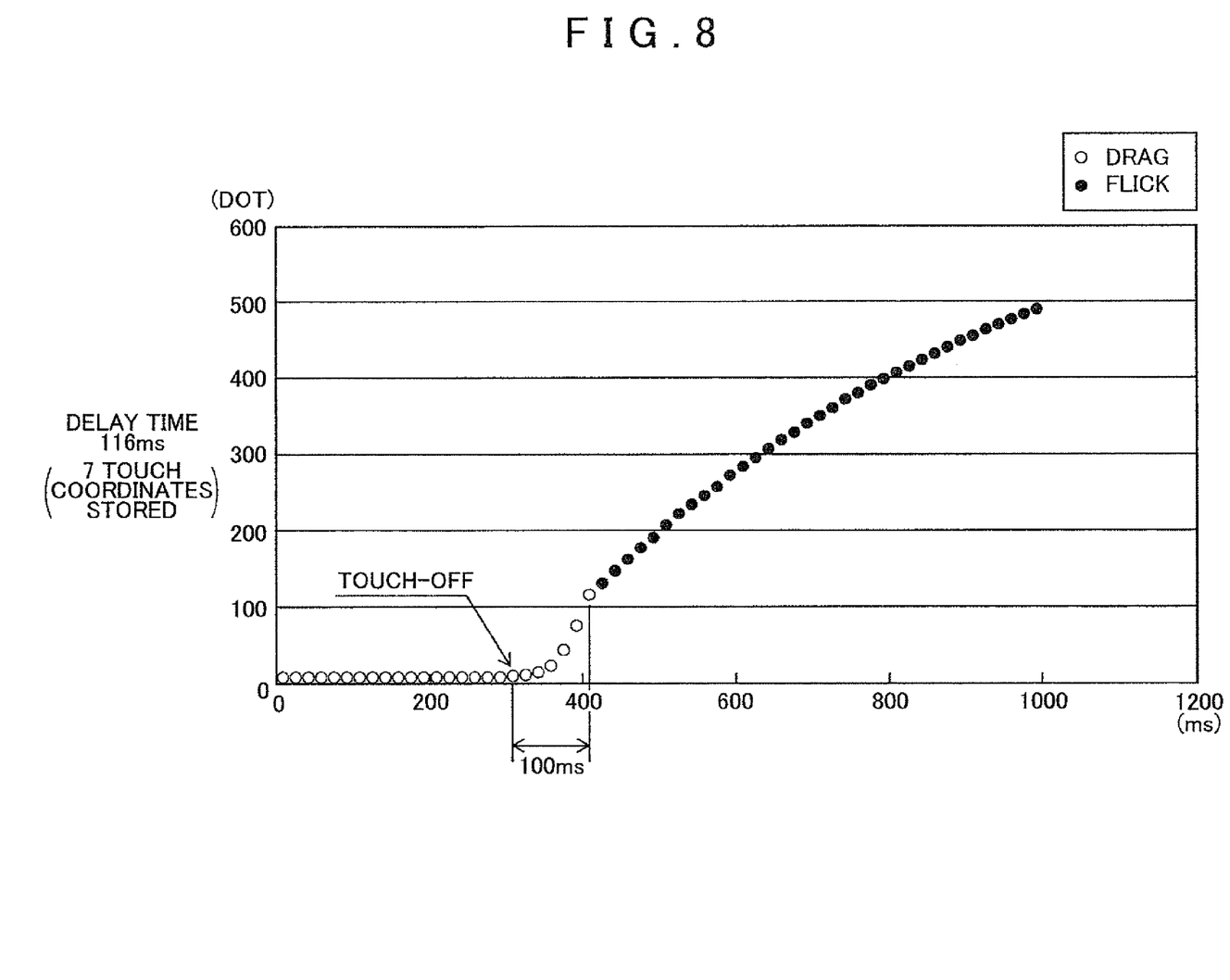
FIG. 8 shows an example of scrolling the image when the delay time is 116 msec. and the pressing cancellation judging time is 100 msec.

As shown in FIG. 8, if the pressing cancellation judging time T2 is 100 msec. and the delay time T1 is 116 msec., the seven drag coordinate memories A to G are provided in the touch coordinate storage area 42A and the seven touch coordinates A to G are stored till the delay time T1 passes after starting the drag operation.

Consequently, after the scroll by the drag operation was sequentially performed to the positions corresponding to the six touch coordinates A to F after the touch-off, the scroll by the flick operation starts. That is, the scroll by the flick operation starts without the drag operation being performed to the position of the touch coordinate G. Therefore, the following capability of the scroll by the drag operation is favorable. In addition, after the scroll by the drag operation has terminated, the scroll by the flick operation is not delayed 20 msec. or more. That is, the scroll by the flick operation starts from almost the same image. Thereby, the transition from the scroll by the drag operation to the scroll by the flick operation is smooth. However, when the scroll by the flick operation starts, the image does not move to the position of the touch coordinate G. Therefore, the following capability when transiting from the scroll by the drag operation to the scroll by the flick operation is slightly worsened.

As detailed above, in the navigation device 1 according to the present example, if the user has performed a drag operation, the CPU 41 stores, in the time sequence, the touch coordinates for six times at intervals of 20 msec. after starting the pressing in the respective drag coordinate memories A to F. The CPU 41, after the delay time T1 (approximately 20 msec.×5=approximately 100 msec.), which is almost the same as the pressing cancellation judging time T2 to judge a determination of the cancellation of the pressing on the display screen, scrolls the image so as to follow the movement of the touch coordinates after starting the pressing, which are stored in the respective drag coordinate memories A to F. In addition, the CPU 41 can acquire the touch coordinates during the drag operation at intervals of approximately 20 msec., store them in the respective drag coordinate memories A to F in the time sequence, and update the respective touch coordinates A to F.

Thus, because the delay time T1 to start the scroll of the image is a short time set to approximately 100 msec. that is almost the same as the pressing cancellation judging time T2, if the user has started a drag operation, it is possible to scroll the image so as to move smoothly following the drag operation after starting the pressing on the display screen.

In addition, if the user has performed a flick operation, it is possible to continuously scroll the image also for the pressing cancellation judging time T2 so as to follow the movement of the touch coordinates A to F for the delay time T1, which are already stored. If the cancellation of the pressing on the display screen has been determined, the image can be scrolled based on the moving direction and the moving speed of the touch coordinates stored at the flick operation on the display screen.

Thus, if the user has performed a flick operation after a drag operation, it is possible to smoothly move the image from the scroll by the drag operation to the scroll by the flick operation even when the pressing cancellation judging time T2 is provided. In addition, if the user has terminated the drag operation, the image stops after the delay time T1 that is a short time set to approximately 100 msec. that is almost the same as the pressing cancellation judging time T2 has passed. Therefore, it is possible to terminate the scroll without giving the user an uncomfortable feeling.

In addition, because the touch coordinates where the user has pressed on the display screen are stored in the respective drag coordinate memories A to F, if the user has pressed the display screen and directly performed a flick operation, it is possible to scroll the image so as to follow the touch coordinates A to F that are already stored in the respective drag coordinate memories A to F for the pressing cancellation judging time T2. Therefore, if the user has directly performed a flick operation after a drag operation, it is possible to smoothly transit from the scroll to follow the movement of the touch coordinates when performing a drag operation with a finger or the like to the scroll by the flick operation without temporarily stopping the scroll of the image.

As shown in FIGS. 5 to 8, if the delay time T1 is set within a range between a time 20% shorter and a time 20% longer with respect to the pressing cancellation judging time T2 (T2=approximately 100 msec.), the CPU 41 scrolls the image delaying between 80 msec. and 120 msec. after starting the drag operation. Therefore, if the user has performed a drag operation, it is possible to smoothly scroll the image without giving the user an uncomfortable feeling.

If a display speed of the liquid crystal display 15 and/or a detection speed of the touch coordinate of the touch panel 18 have been improved compared to the present example, it is possible to smoothly transit from the scroll by the drag operation to the scroll by the flick operation even when the time difference between the delay time T1 and the pressing cancellation judging time T2 are set to a range slightly greater than 20% of the pressing cancellation judging time T2.

If the user has performed a flick operation after a drag operation, it is possible for the pressing cancellation judging time T2 to read out the touch coordinates A to E or the touch coordinates A to F which are stored in the respective drag coordinate memories A to F in the time sequence and scroll the image so as to follow the movement of the touch coordinates A to F. Therefore, if the user has performed a flick operation after a drag operation, it is possible to smoothly transit from the scroll by the drag operation to the scroll by the flick operation almost without stopping the scroll of the image.

In addition, if a pressure sensitive system touch panel is employed as the touch panel 18, it is necessary to provide the pressing cancellation judging time T2 for determining the cancellation of the pressing on the display screen. Consequently, even when the pressing cancellation judging time T2 is provided, it is possible to scroll the image so as to follow the movement of the touch coordinates A to F that are stored in the respective drag coordinate memories A to F.

Therefore, even when the pressure sensitive system touch panel is employed as the touch panel 18 and the pressing cancellation judging time T2 is provided, if the user has performed a flick operation after a drag operation, it is possible to smoothly transit from the scroll by the drag operation to the scroll by the flick operation without temporarily stopping the scroll of the image.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, if the pressing of the touch panel 18 has started, the CPU 41 may store, in the time sequence in the touch coordinate storage area 42A, the touch coordinate when starting the pressing of the touch panel 18 and all of the touch coordinates acquired every time 20 msec. has passed since the previous touch coordinate was acquired.

If the delay time T1 has passed since starting the drag operation, the CPU 41 may read out, at intervals of 20 msec. in the time sequence, the touch coordinates after starting the pressing, which are stored in the time sequence in the touch coordinate storage area 42A, and scroll the image so as to move the point of the image corresponding to the previous touch coordinate read from the RAM 42 to the current touch coordinate.

In addition, if the touch-off has been detected, the CPU 41 may read out, also for the pressing cancellation judging time T2 at intervals of 20 msec. in the time sequence, the touch coordinates after starting the pressing, which are stored in the time sequence in the touch coordinate storage area 42A, and scroll the image so as to move the point of the image corresponding to the previous touch coordinate read from the RAM 42 to the current touch coordinate. Thereby, it becomes unnecessary to update the touch coordinates stored in the respective drag coordinate memories A to F. Consequently, it is possible to increase the speed of the touch scroll processing.

In addition, for example, if an electrostatic capacitance system or an optical sensor liquid crystal system in which the screen of the liquid crystal display 15 is directly pressed, or the like is employed as the touch panel 18 and the pressing cancellation judging time is provided, it is possible, by executing the processings from S11 to S26 to produce the same effect as the above-mentioned example in which a pressure sensitive system touch panel is employed as the touch panel 18.

What is claimed is:

1. An image display device, comprising:
   a display unit that displays an image and accepts a pressing operation on a display screen;
   a memory; and
   a controller that:
   detects pressed coordinate positions on the display screen;
   stores the detected pressed coordinate positions in the memory at a predetermined time interval and in a time sequence;
   if, after a pressing on the display screen has been cancelled, the display screen is not pressed again before a predetermined pressing cancellation judging time passes, determines a cancellation of the pressing on the display screen;
   sets a predetermined delay time based on the predetermined pressing cancellation judging time;
   after the predetermined delay time has passed since the pressing on the display screen started, reads out the stored pressed coordinate positions at the predetermined time interval and in the time sequence; and
   scrolls the image so as to follow a movement of the read-out pressed coordinate positions.

2. The image display device according to claim 1, wherein:
   the predetermined delay time is set within a range between a time 20% shorter than the predetermined pressing cancellation judging time and a time 20% longer than the predetermined pressing cancellation judging time.

3. The image display device according to claim 1, wherein:
   the predetermined delay time is set so as to be a time longer than the predetermined pressing cancellation judging time.

4. The image display device according to claim 1, further comprising:
   a pressure-sensitive touch panel placed on the display screen;
   wherein the controller detects the pressed coordinate positions through the pressure-sensitive touch panel.

5. A navigation device comprising the image display device of claim 1.

6. An image display method, comprising:
   displaying an image on a display screen;

detecting pressed coordinate positions on the display screen;

storing the detected pressed coordinate positions in a memory at a predetermined time interval and in a time sequence;

if, after a pressing on the display screen has been cancelled, the display screen is not pressed again before a predetermined pressing cancellation judging time passes, determining a cancellation of the pressing on the display screen;

setting a predetermined delay time based on the predetermined pressing cancellation judging time;

after the predetermined delay time has passed since the pressing on the display screen started, reading out the stored pressed coordinate positions at the predetermined time interval and in the time sequence; and scrolling the image so as to follow a movement of the read-out pressed coordinate positions.

7. The image display method according to claim 6, further comprising:

setting the predetermined delay time within a range between a time 20% shorter than the predetermined pressing cancellation judging time and a time 20% longer than the predetermined pressing cancellation judging time.

8. The image display method according to claim 6, further comprising:

setting the predetermined delay time so as to be a time longer than the predetermined pressing cancellation judging time.

9. The image display method according to claim 6, further comprising:

detecting the pressed coordinate positions through a pressure-sensitive touch panel.

10. The image display device according to claim 6, wherein the method is implemented by a navigation device.

11. A non-transitory storage medium storing a computer-executable image display program, the program comprising:

instructions for displaying an image on a display screen;

instructions for detecting pressed coordinate positions on the display screen;

instructions for storing the detected pressed coordinate positions in a memory at a predetermined time interval and in a time sequence;

instructions for, if after a pressing on the display screen has been cancelled, the display screen is not pressed again before a predetermined pressing cancellation judging time passes, determining a cancellation of the pressing on the display screen;

instructions for setting a predetermined delay time based on the predetermined pressing cancellation judging time;

instructions for, after the predetermined delay time has passed since the pressing on the display screen started, reading out the stored pressed coordinate positions at the predetermined time interval and in the time sequence; and instructions for scrolling the image so as to follow a movement of the read-out pressed coordinate positions.

12. The storage medium according to claim 11, the program further comprising:

instructions for setting the predetermined delay time within a range between a time 20% shorter than the predetermined pressing cancellation judging time and a time 20% longer than the predetermined pressing cancellation judging time.

13. The storage medium according to claim 11, further comprising:

instructions for setting the predetermined delay time so as to be a time longer than the predetermined pressing cancellation judging time.

14. The storage medium according to claim 11, the program further comprising:

instructions for detecting the pressed coordinate positions through a pressure-sensitive touch panel.

* * * * *